(12) United States Patent
Kobayashi et al.

(10) Patent No.: US 12,062,976 B2
(45) Date of Patent: Aug. 13, 2024

(54) POWER SUPPLY CIRCUIT AND POWER SUPPLY DEVICE

(71) Applicant: FUJI ELECTRIC CO., LTD., Kawasaki (JP)

(72) Inventors: Yoshinori Kobayashi, Matsumoto (JP); Masayuki Yamadaya, Matsumoto (JP); Hironobu Shiroyama, Matsumoto (JP); Toshimitsu Morimoto, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 211 days.

(21) Appl. No.: 17/703,486

(22) Filed: Mar. 24, 2022

(65) Prior Publication Data

US 2022/0376614 A1 Nov. 24, 2022

(30) Foreign Application Priority Data

May 21, 2021 (JP) ................. 2021-086155

(51) Int. Cl.
*H02M 1/42* (2007.01)
*H02M 1/08* (2006.01)
*H02M 3/335* (2006.01)
*H04N 5/63* (2006.01)

(52) U.S. Cl.
CPC ........... *H02M 1/4225* (2013.01); *H02M 1/08* (2013.01); *H02M 3/33571* (2021.05); *H04N 5/63* (2013.01)

(58) Field of Classification Search
CPC ...... H02M 3/158; H02M 1/08; H02M 1/0022; H02M 1/15
See application file for complete search history.

(56) References Cited

U.S. PATENT DOCUMENTS

2011/0292704 A1* 12/2011 Makino ................ H05B 45/385
363/126
2022/0216797 A1* 7/2022 Endo .................... H02M 1/4225

FOREIGN PATENT DOCUMENTS

| JP | 2013-096902 A | 5/2013 |
| JP | 2014-153451 A | 8/2014 |
| JP | 2014-193018 A | 10/2014 |
| JP | 2014-220867 A | 11/2014 |
| JP | 2014-233129 A | 12/2014 |

* cited by examiner

*Primary Examiner* — Jue Zhang
*Assistant Examiner* — Afework S Demisse
(74) *Attorney, Agent, or Firm* — Rabin & Berdo. P.C.

(57) ABSTRACT

A power supply circuit of a step-down type, configured to generate an output voltage at a predetermined level from an alternating current (AC) voltage. The power supply circuit includes a rectifier circuit configured to rectify the AC voltage, a first line coupled to the rectifier circuit, a second line on a ground side, a switch coupled between the first line and the second line, and a control circuit configured to control the switch to bring a level of the output voltage to the predetermined level. The power supply circuit is free of an inductor interposed between the first line and the rectifier circuit.

7 Claims, 6 Drawing Sheets

POWER SUPPLY CIRCUIT AND POWER SUPPLY DEVICE

CROSS-REFERENCE TO RELATED APPLICATION

The present application claims priority pursuant to 35 U.S.C. § 119 from Japanese patent application number 2021-086155 filed on May 21, 2021, the entire disclosure of which is hereby incorporated by reference herein.

BACKGROUND

Technical Field

The present disclosure relates to a power supply circuit and a power supply device.

Description of the Related Art

There are power supply circuits that generate an output voltage at a predetermined level from an alternating current (AC) voltage (for example, Japanese Patent Application Publication Nos. 2013-096902, 2014-153451, 2014-193018, 2014-220867, and 2014-233129).

Some power supply circuits use a Zener diode to generate an output voltage at a predetermined level.

However, generally, in a power supply circuit using a Zener diode, current flows through the Zener diode steadily during generation of an output voltage at a predetermined level, and it is therefore difficult to lower power consumption.

SUMMARY

An aspect of the present disclosure is a power supply circuit of a step-down type configured to generate an output voltage at a predetermined level from an alternating current (AC) voltage, the power supply circuit comprising: a rectifier circuit configured to rectify the AC voltage; a first line coupled to the rectifier circuit; a second line on a ground side; a switch coupled between the first line and the second line; and a control circuit configured to control the switch to bring a level of the output voltage to the predetermined level, wherein the power supply circuit is free of an inductor interposed between the first line and the rectifier circuit.

Another aspect of the present disclosure is a power supply device comprising: a first power supply circuit of a step-down type, configured to generate a first output voltage at a predetermined level from an alternating current (AC) voltage; a second power supply circuit of a booster type, configured to generate a second output voltage from the AC voltage; a control device coupled to the first power supply circuit and the second power supply circuit; and a switching device having a first end and a second end, the first end receiving the AC voltage, the second end being coupled to the second power supply circuit, wherein the first power supply circuit includes a first rectifier circuit configured to rectify the AC voltage, a first line coupled to the first rectifier circuit, a second line on a ground side, a switch coupled between the first line and the second line, and a control circuit configured to control the switch to bring a level of the first output voltage to the predetermined level, the first power supply circuit being free of an inductor interposed between the first line and the first rectifier circuit; and the second power supply circuit includes a second rectifier circuit coupled to the second end of the switching device, the second rectifier circuit being configured to rectify the AC voltage when the switching device is on, to thereby generate a second rectified voltage, and an output circuit including an inductor coupled to the second rectifier circuit, and another switch configured to control current flowing through the inductor, the output circuit being configured to output the second output voltage based on the second rectified voltage from the second rectifier circuit, wherein the control device is configured to receive a predetermined instruction, receive the first output voltage as a power supply voltage thereof, and control the switching device based on the predetermined instruction.

DETAILED DESCRIPTION

At least following matters will become apparent from the descriptions of the present specification and the accompanying drawings.

Embodiments

Overview of the Power Supply Device 10

Figure 1:
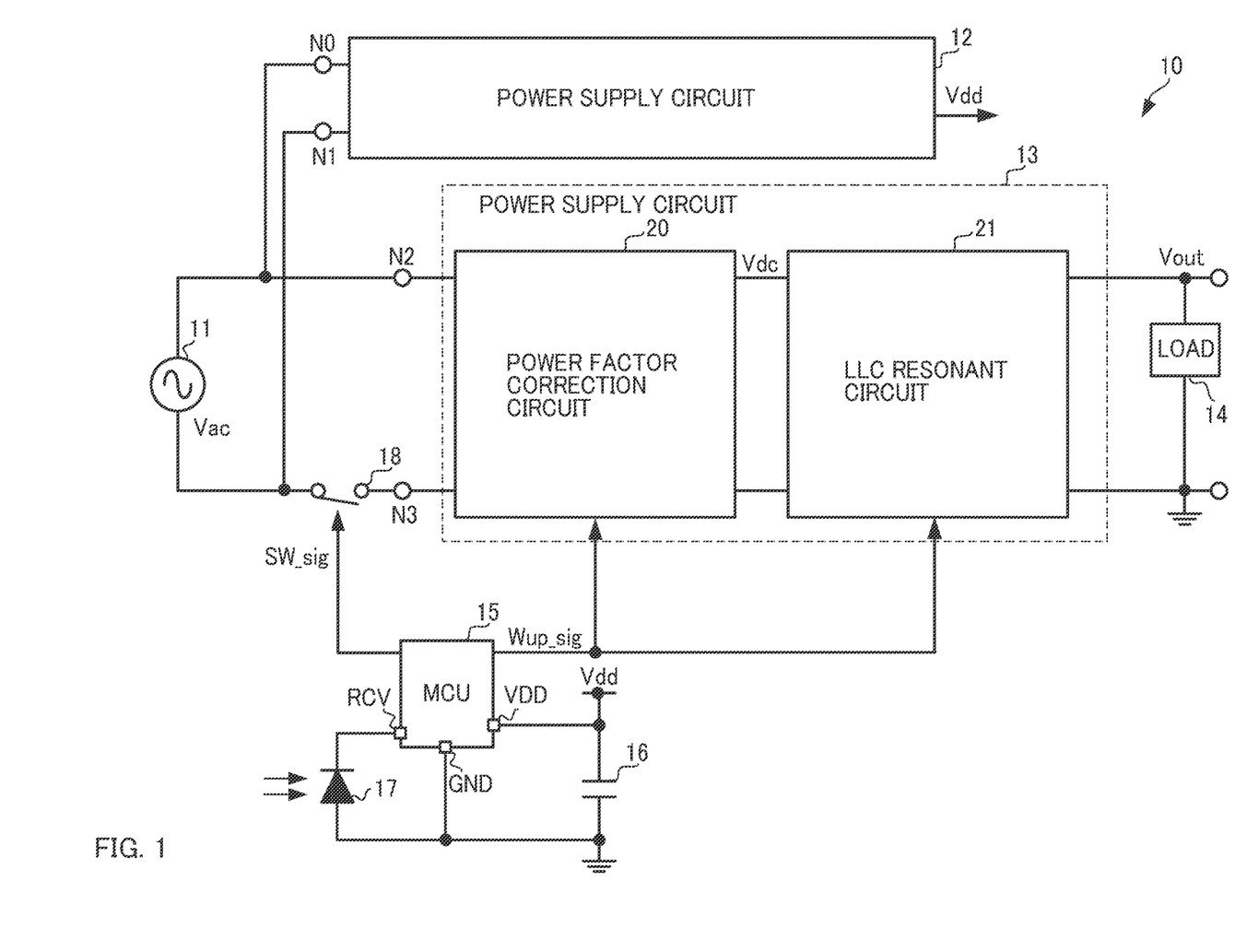
FIG. 1 is a diagram illustrating an example of a power supply device 10.

FIG. 1 is a diagram illustrating an example of a power supply device 10. The power supply device 10 is used as a power supply for, for example, a television (not illustrated). The power supply device 10 is configured including power supply circuits 12, 13, a load 14, a microcomputer (MCU) 15, a capacitor 16, a photodiode 17, and a switch 18. Note that nodes N0, N1 are input nodes of the power supply circuit 12, and nodes N2, N3 are input nodes of the power supply circuit 13.

An AC power supply 11 supplies an AC voltage Vac to the power supply circuits 12, 13. The power supply circuit 12 is a power supply circuit of a step-down type that generates an output voltage Vdd by stepping down the AC voltage Vac applied to the nodes N0, N1. The effective value of the AC voltage Vac is 100 V to 240 V, and the voltage value of the output voltage Vdd is approximately 5 V to 10 V.

The power supply circuit 13 generates an output voltage Vout from the AC voltage Vac applied to the nodes N2, N3 and supplies power to the load 14 (e.g., a television).

The microcomputer 15 controls the power supply device 10 based on an instruction from a user. The microcomputer 15 operates by receiving the output voltage Vdd from the power supply circuit 12, and the capacitor 16 is provided to stabilize the output voltage Vdd.

When the photodiode 17 receives a signal transmitted from a remote controller (not illustrated) to turn on the load 14, the microcomputer 15 sends a signal SW_sig for turning on the switch 18 serving as a relay. As a result, the switch 18 is turned on, applying the AC voltage Vac to the power supply circuit 13. After that, the microcomputer 15 sends a signal Wup_sig to the power supply circuit 13 to activate the power supply circuit 13. By receiving the signal Wup_sig for activating the power supply circuit 13, the power supply circuit 13 is activated and supplies power to the load 14.

By contrast, when the photodiode 17 receives a signal transmitted from the remote controller (not illustrated) to turn off the load 14, the microcomputer 15 sends a signal SW_sig for turning off the switch 18. As a result, the switch 18 is turned off, stopping supply of the AC voltage Vac to the power supply circuit 13. After that, the power supply circuit 13 stops power supply to the load 14, bringing the load 14 into standby state. Details of the microcomputer 15 will be described later. Note that the power supply circuit 12 corresponds to a "power supply circuit" and a "first power supply circuit", and the microcomputer 15 corresponds to a "first load".

Overview of the Power Supply Circuit 12

Figure 2:
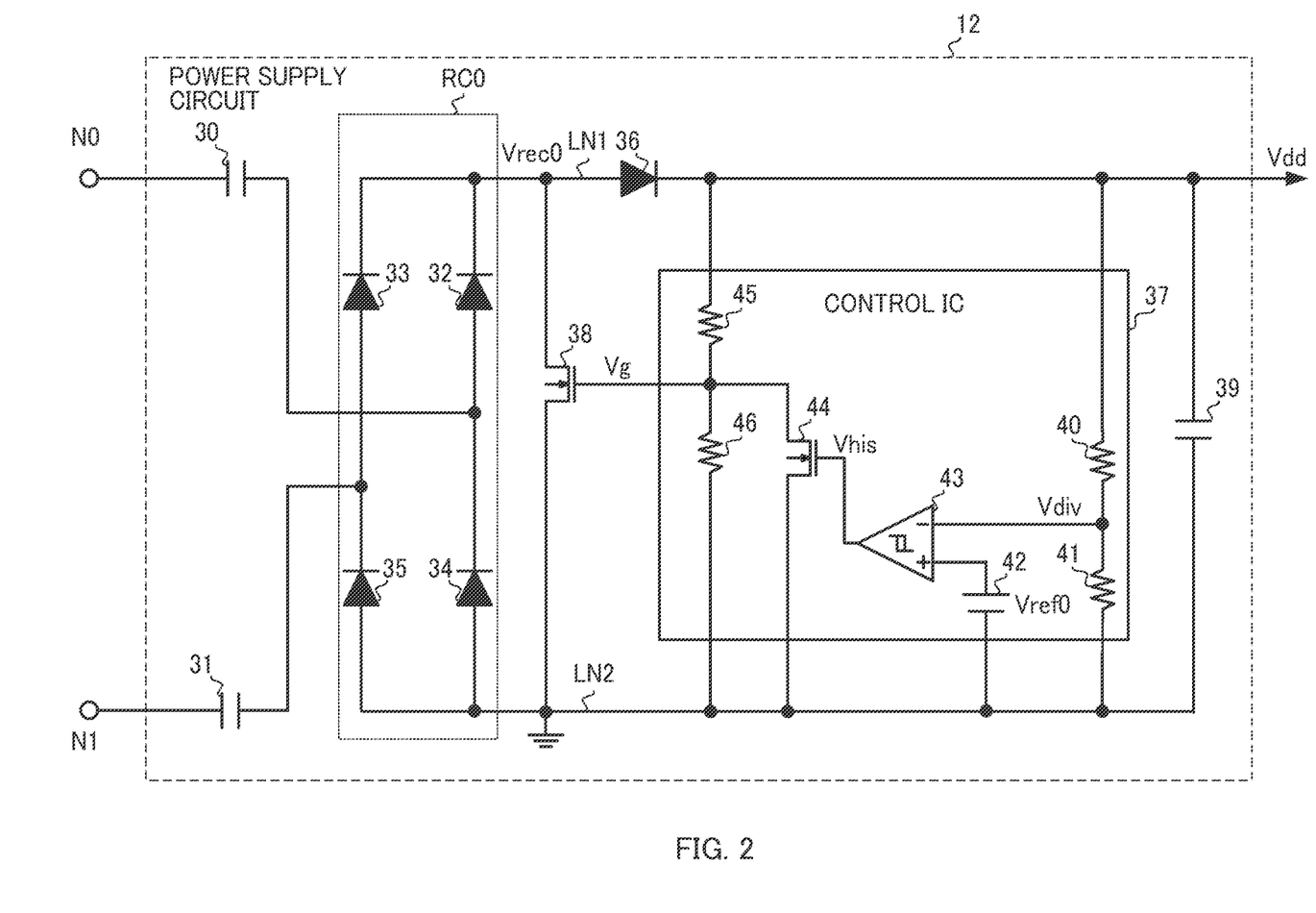
FIG. 2 is a diagram illustrating an example of a power supply circuit 12.

FIG. 2 is a diagram illustrating an example of the power supply circuit 12. The power supply circuit 12 is a power supply circuit of a step-down type that generates a DC power supply voltage Vdd for the microcomputer 15 by stepping down the AC voltage Vac applied to the nodes N0, N1. The power supply circuit 12 can also supply maximum power P1 to the microcomputer 15. The power supply circuit 12 is configured including capacitors 30, 31, 39, diodes 32 to 36, a control IC 37, and an NMOS (N-type metal-oxide semiconductor) transistor 38. The power supply circuit 12 is a circuit that generates the power supply voltage Vdd without including a coil (i.e., an inductor) as an electric device. Note that the power supply voltage Vdd corresponds to an "output voltage" and a "first output voltage", and the maximum power P1 corresponds to "first power" that the power supply circuit 12 is capable of supplying to the load.

The capacitors 30, 31 are used to, e.g., remove noise generated in the power supply circuit 12, limit current from the AC power supply 11, remove a DC component in the AC voltage Vac, and convert the AC voltage Vac to current. Note that the capacitor 30 corresponds to a "first capacitor", and the capacitor 31 corresponds to a "second capacitor".

The diodes 32 to 35 form a full-wave rectifier circuit RC0 that full-wave rectifies the AC voltage Vac. The full-wave rectifier circuit RC0 full-wave rectifies the AC voltage from the capacitors 30, 31 and applies a rectified voltage Vrec0 to the anode of the diode 36 and the drain of the NMOS transistor 38 that are coupled to a first line LN1. The cathodes of the diodes 32, 33 are coupled to the first line LN1 with no coil as an electric device interposed therebetween, and the anodes of the diodes 34, 35 are coupled to a second line LN2 on the ground side. In other words, the power supply circuit 12 does not include a coil as an electric device between the full-wave rectifier circuit RC0 and the diode 36 to be described later (i.e., on the first line LN1). An "electric device" is what is called a discrete electronic component. Thus, what is meant by "the state where the first line LN1 is coupled with no coil (or an inductor) as an electric device interposed" is that the diodes 32, 33 are coupled to the first line LN1 without using inductance other than the parasitic inductance in wiring.

The anode of the diode 32 and the cathode of the diode 34 are coupled to the node N0 via the capacitor 30. Meanwhile, the anode of the diode 33 and the cathode of the diode 35 are coupled to the node N1 via the capacitor 31. In other words, the AC voltage Vac is applied to the capacitors 30, 31. Note that the diodes 32 to 35 correspond to a "rectifier circuit" and a "first rectifier circuit", and the rectified voltage Vrec0 corresponds to a "first rectified voltage". In addition, the point where the anode of the diode 32 and the cathode of the diode 34 are coupled corresponds to a "first input terminal", and the point where the anode of the diode 33 and the cathode of the diode 35 are coupled corresponds to a "second input terminal".

The diode 36 keeps current from flowing reversely from the capacitor 39 toward the full-wave rectifier circuit RC0. Specifically, the diode 36 is turned on when the voltage at the anode of the diode 36 is higher than the charging voltage of the capacitor 39 by a forward voltage at the diode 36 or more, and charges the capacitor 39 by supplying current to the capacitor 39.

Meanwhile, when the voltage at the anode of the diode 36 is lower than the charging voltage of the capacitor 39, the diode 36 is turned off and stops supplying current to the capacitor 39. As a result, the capacitor 39 is not charged in this case. The diode 36 is coupled to the first line LN1 at its anode and coupled to the capacitor 39 at its cathode.

Details of the Control IC 37

The control IC 37 controls the NMOS transistor 38 to bring the level of the power supply voltage Vdd to a predetermined level. The control IC 37 is configured including resistors 40, 41, 45, 46, a reference voltage circuit 42, a hysteresis comparator 43, and an NMOS transistor 44. The resistors 40, 41 form a voltage divider circuit and generate a divided voltage Vdiv by dividing the power supply voltage Vdd. The reference voltage circuit 42 outputs a reference voltage Vref0 used to bring the power supply voltage Vdd to the predetermined level.

The hysteresis comparator 43 compares the divided voltage Vdiv with a high threshold voltage VrefH and a low threshold voltage VrefL determined in accordance with the reference voltage Vref0 and turns on or off the NMOS transistor 44 accordingly. The hysteresis comparator 43 has the high threshold voltage VrefH and the low threshold voltage VrefL determined in accordance with the reference voltage Vref0. Note that the high threshold voltage VrefH is higher than the low threshold voltage VrefL.

Specifically, when the divided voltage Vdiv exceeds the high threshold voltage VrefH, the hysteresis comparator 43 outputs a signal Vhis at low level (hereinafter referred to as "L" level), turning off the NMOS transistor 44.

Meanwhile, when the divided voltage Vdiv exceeds the high threshold voltage VrefH and then falls below the low threshold voltage VrefL, the hysteresis comparator 43 outputs the signal Vhis at high level (hereinafter referred to as "H" level), turning on the NMOS transistor 44.

Note that a level VL1 of the power supply voltage Vdd that causes the divided voltage Vdiv to fall below the low threshold voltage VrefL corresponds to a "first level", and a level VL2 of the power supply voltage Vdd that causes the divided voltage Vdiv to exceed the high threshold voltage VrefH corresponds to a "second level".

The resistors 45, 46 generate a gate voltage Vg that varies depending on whether the NMOS transistor 44 is on or off. Specifically, when the NMOS transistor 44 is on, the resistors 45, 46 generate the gate voltage Vg to turn off the NMOS transistor 38. By contrast, when the NMOS transistor 44 is off, the resistors 45, 46 generate the gate voltage Vg to turn on the NMOS transistor 38 in the linear region.

Thus, when the power supply voltage Vdd is at the level VL1, the control IC 37 outputs the gate voltage Vg that turns off the NMOS transistor 38. Meanwhile, when the power supply voltage Vdd is at the level VL2, the control IC 37 outputs the gate voltage Vg that turns on the NMOS transistor 38. Note that the level VL2 is higher than the level VL1.

Path of Charging Current in the Power Supply Circuit 12

The NMOS transistor 38 is coupled to the first line LN1 at its drain and coupled to the second line LN2 at its source. The NMOS transistor 38 is controlled by the gate voltage Vg from the control IC 37 and operates as a switch. The NMOS transistor 38 is turned off when the power supply voltage Vdd is at the level VL1 (i.e., the divided voltage Vdiv falls below the low threshold voltage VrefL). In this case, the rectified voltage Vrec0 is applied to the capacitor 39 via the diode 36. As a result, the capacitor 39 is charged with the rectified voltage Vrec0 and generates the power supply voltage Vdd. Note that the power supply voltage Vdd is, for example, 5V. The path of current in this case is described in detail below using FIG. 3.

Figure 3:
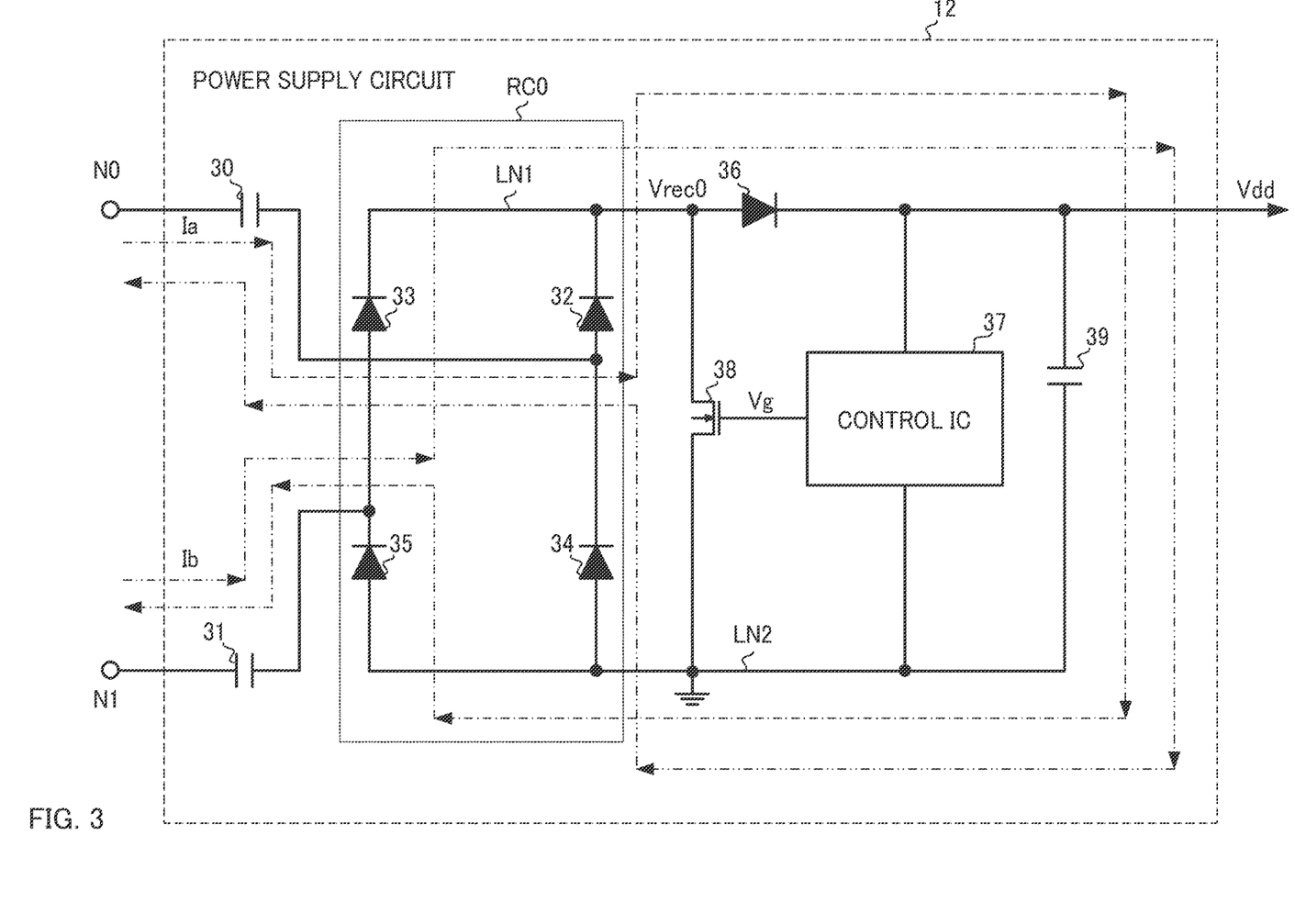
FIG. 3 is a diagram illustrating an example of a path that current flows when the power supply circuit 12 is operated in charging mode.

FIG. 3 is a diagram illustrating the path that current flows when the power supply circuit 12 is operated in charging mode. Note that the current path indicated by a dashed-dotted line is the path that current Ia flows when a positive AC voltage Vac is applied to the node N0. Also, the current path indicated by a dashed double-dotted line is the path that current Ib flows when a negative AC voltage Vac is applied to the node N0.

When the NMOS transistor 38 is off and a positive AC voltage Vac is applied to the node N0, current Ia determined in accordance with the AC voltage Vac flows as indicated by the dashed-dotted line.

Specifically, when the NMOS transistor 38 is off and the AC voltage Vac applied to the node N0 is a positive voltage, the current Ia inputted from the node N0 flows to the node N1 via the capacitor 30, the diodes 32, 36, the capacitor 39, the diode 35, and the capacitor 31 sequentially.

By contrast, when the NMOS transistor 38 is off and a negative AC voltage Vac is applied to the node N0, the current Ib determined in accordance with the AC voltage Vac flows as indicated by the dashed double-dotted line.

Specifically, when the NMOS transistor 38 is off and the AC voltage Vac applied to the node N0 is a negative voltage, the current Ib inputted from the node N1 flows to the node N0 via the capacitor 31, the diodes 33, 36, the capacitor 39, the diode 34, and the capacitor 30 sequentially.

Thus, when the power supply voltage Vdd is at the level VL1 and the NMOS transistor 38 is turned off, the capacitor 39 is charged with the current Ia, Ib determined in accordance with the AC voltage Vac. As a result, the power supply voltage Vdd increases from the level VL1.

Path of Free-Wheeling Current in the Power Supply Circuit 12

The NMOS transistor 38 is turned on when the power supply voltage Vdd is at the level VL2 (i.e., the divided voltage Vdiv exceeds the high threshold voltage VrefH). In this case, the rectified voltage Vrec0 is not applied to the capacitor 39 via the diode 36. Thus, the capacitor 39 is not charged with the rectified voltage Vrec0. Instead, the NMOS transistor 38 causes current determined in accordance with the rectified voltage Vrec0 to return to the AC power supply 11 via the diodes 32 to 35. The current path in this case is described in detail below using FIG. 4.

Figure 4:
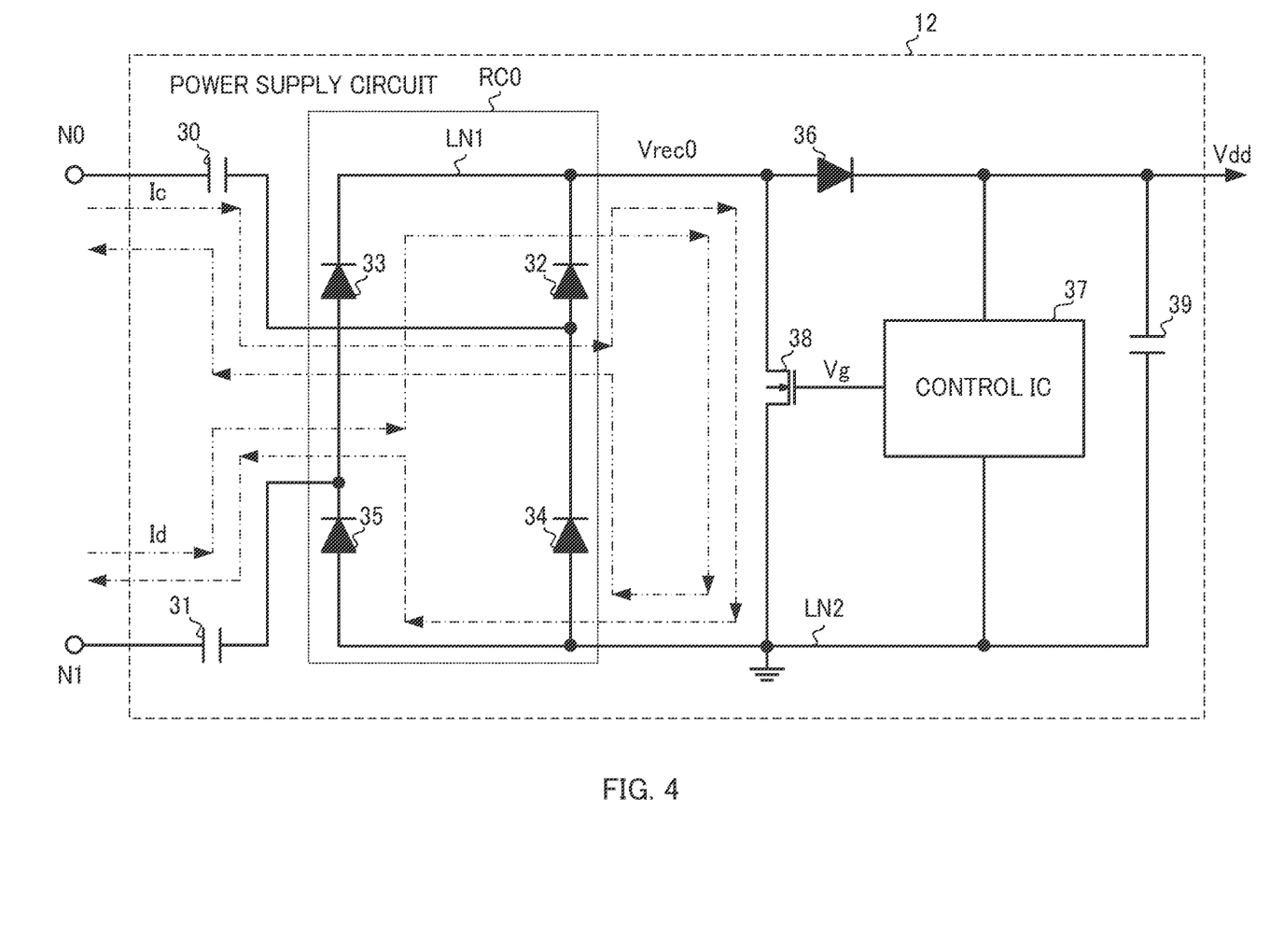
FIG. 4 is a diagram illustrating an example of a path that current flows when the power supply circuit 12 is operating in free-wheeling mode.

FIG. 4 is a diagram illustrating an example of the path that current flows when the power supply circuit 12 is operated in free-wheeling mode. Note that the current path indicated by a dashed-dotted line is the path that current Ic flows when a positive AC voltage Vac is applied to the node N0. Also, the current path indicated by a dashed double-dotted line is the path that current Id flows when a negative AC voltage Vac is applied to the node N0.

When the NMOS transistor 38 is on and a positive AC voltage Vac is applied to the node N0, current Ic determined in accordance with the AC voltage Vac flows as indicated by the dashed-dotted line.

Specifically, when the NMOS transistor 38 is on and the AC voltage Vac applied to the node N0 is a positive voltage, the current Ic inputted from the node N0 flows to the node N1 via the capacitor 30, the diode 32, the NMOS transistor 38, the diode 35, and the capacitor 31 sequentially.

By contrast, when the NMOS transistor 38 is on and a negative AC voltage Vac is applied to the node N0, the current Id determined in accordance with the AC voltage Vac flows as indicated by the dashed double-dotted line.

Specifically, when the NMOS transistor 38 is on and the AC voltage Vac applied to the node N0 is a negative voltage, the current Id inputted from the node N1 flows to the node N0 via the capacitor 31, the diode 33, the NMOS transistor 38, the diode 34, and the capacitor 30 sequentially.

Thus, when the power supply voltage Vdd is at the level VL2 and the NMOS transistor 38 is turned on, the current Ic, Id determined in accordance with the AC voltage Vac returns to the AC power supply 11 via the NMOS transistor 38. Thus, the capacitor 39 is not charged with the current Ic, Id determined in accordance with the AC voltage Vac. As a result, the power supply voltage Vdd decreases from the level VL2.

As thus described, when the power supply voltage Vdd is at the level VL1, the control IC 37 charges the capacitor 39 and therefore supplies the capacitor 39 with the current Ia, Ib from the AC power supply 11. Meanwhile, when the power supply voltage Vdd is at the level VL2, the control IC 37 causes the current Ic, Id inputted from the nodes N0, N1 to return to the AC power supply 11. As a result, the control IC 37 can stably apply the power supply voltage Vdd at the predetermined level to the microcomputer 15 while lowering the power consumed by the power supply circuit 12.

Also, the power supply voltage Vdd is generated at the capacitor 39 to which the rectified voltage Vrec0 is applied. Thus, the average of the charging voltage of the capacitor 39 (i.e., the power supply voltage Vdd) is at the predetermined level of the power supply voltage Vdd while the charging voltage of the capacitor 39 has a ripple component determined in accordance with the rectified voltage Vrec0. Note that the control IC 37 corresponds to a "control circuit", and the NMOS transistor 38 corresponds to a "switch".

Overview of the Power Supply Circuit 13

Referring back to FIG. 1, the power supply circuit 13 generates the output voltage Vout from the AC voltage Vac and supplies power to the load 14 (e.g., a television). The power supply circuit 13 is configured including a power factor correction circuit 20 and an LLC resonant circuit 21. The power factor correction circuit 20 is an AC-DC converter that generates a DC voltage Vdc from the AC voltage Vac, and the LLC resonant circuit 21 is a DC-DC converter that generates the output voltage Vout by stepping down the DC voltage Vdc.

Overview of the Power Factor Correction Circuit 20

Figure 5:
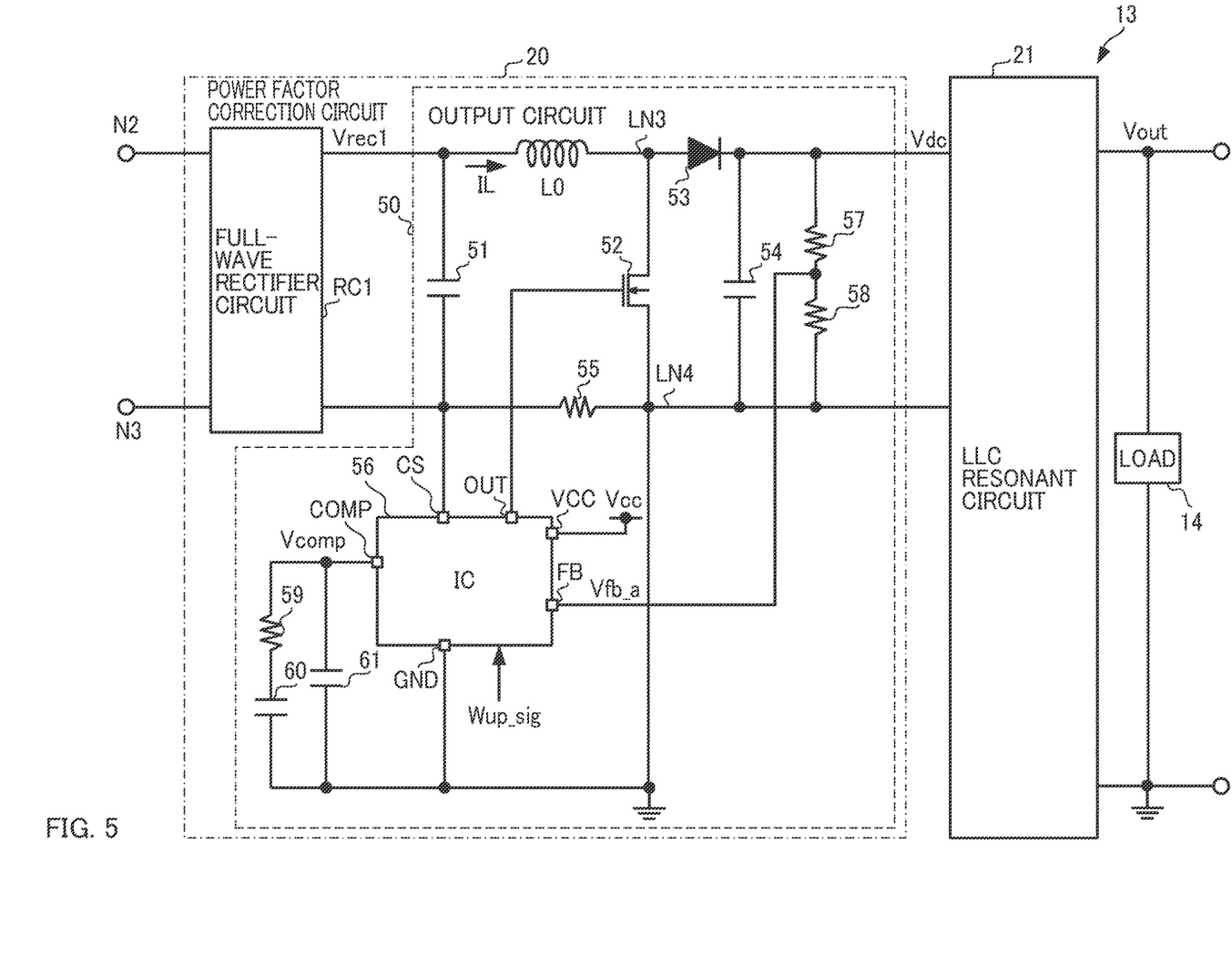
FIG. 5 is a diagram illustrating an example of a power factor correction circuit 20.

FIG. 5 is a diagram illustrating an example of the power factor correction circuit 20. The power factor correction circuit 20 is a boost-chopper power supply circuit that generates a DC voltage Vdc at a target level from the AC voltage Vac from a commercial power supply. The effective value of the AC voltage Vac is 100 V to 240 V, and the voltage value of the DC voltage Vdc is approximately 400 V. In other words, the power factor correction circuit 20 is a boost power supply circuit that generates the DC voltage Vdc by boosting the AC voltage Vac. The power factor correction circuit 20 can also supply maximum power P2 to the LLC resonant circuit 21. The power factor correction circuit 20 is configured including a full-wave rectifier circuit RC1 and an output circuit 50. Note that the maximum power P2 corresponds to a "second power" that the power factor correction circuit 20 is capable of supplying to the load. Also, 100 times of the maximum power P1 is smaller than the maximum power P2. In other words, the maximum power P2 is larger than the maximum power P1 by two digits or more.

The output circuit 50 is configured including a coil L0, capacitors 51, 54, 60, 61, an NMOS transistor 52, a diode 53, resistors 55, 57, 58, 59, and an integrated circuit (IC) 56.

The full-wave rectifier circuit RC1 full-wave rectifies the predetermined AC voltage Vac applied to the nodes N2, N3 and applies a resultant rectified voltage Vrec1 to the capacitor 51 and the coil L0. Herein, the AC voltage Vac is a voltage of, for example, 100 V to 240 V at a frequency of 50 Hz to 60 Hz. The capacitor 51 is a device for smoothing the rectified voltage Vrec1. Note that the full-wave rectifier circuit RC1 corresponds to a "second rectifier circuit", and the rectified voltage Vrec1 corresponds to a "second rectifier voltage".

Although applied directly to one end of the coil L0 here, the rectified voltage Vrec1 may be alternatively applied to the coil L0 via, for example, a device such as a resistor (not illustrated).

The coil L0 forms a boost-chopper circuit together with the NMOS transistor 52, the diode 53, and the capacitor 54. Thus, the charging voltage of the capacitor 54 is the DC voltage Vdc. The other end of the coil L0 is coupled to a third line LN3, and the NMOS transistor 52 is coupled, as a switch, between the third line LN3 and a fourth line LN4 on the ground side. When the NMOS transistor 52 is turned on, inductor current IL determined in accordance with the rectified voltage Vrec1 flows through the coil L0. Also, the inductor current IL that flows when the NMOS transistor 52 is turned on increases while the NMOS transistor 52 is on, at a slope determined by the inductance value of the coil L0 and the rectified voltage Vrec1.

After that, if the NMOS transistor 52 is turned off, a counter electromotive force is generated at the coil L0, and while this counter electromotive force is large enough to turn on the diode 53, the inductor current IL for charging the capacitor 54 flows from the coil L0 to the capacitor 54. Note that the DC voltage Vdc is, for example, 400 V.

The resistor 55 is a device for converting the inductor current IL flowing through the coil L0 into a voltage and outputs the voltage as a negative voltage. The negative voltage generated at the resistor 55 is applied to a terminal CS of the integrated circuit 56 to be described later. Also, the integrated circuit 56 detects the timing at which the inductor current IL finishes flowing based on the negative voltage generated at the resistor 55, and turns on the NMOS transistor 52.

The integrated circuit 56 is an integrated circuit that drives the NMOS transistor 52 to bring the level of the DC voltage Vdc to a target level (e.g., 400 V) while improving the power factor of the power factor correction circuit 20. Specifically, the integrated circuit 56 drives the NMOS transistor 52 based on the inductor current IL and the DC voltage Vdc.

The integrated circuit 56 is provided with terminals VCC, FB, CS, COMP, OUT, GND. Other terminals than these six terminals VCC, FB, CS, COMP, OUT, GND are provided to the integrated circuit 56, but are not illustrated here for convenience.

The NMOS transistor 52 is a transistor for controlling power to the LLC resonant circuit 21. Although the NMOS transistor 52 is a metal-oxide semiconductor (MOS) transistor in the embodiment of the present disclosure, the present disclosure is not limited to this. The NMOS transistor 52 may be, for example, a bipolar transistor as long as the transistor can control power. The gate of the NMOS transistor 52 is coupled in such a manner as to be driven by a signal from the terminal OUT.

The resistors 57, 58 form a voltage divider circuit that divides the DC voltage Vdc and generate a feedback voltage Vfb_a to be used in driving the NMOS transistor 52. Note that the feedback voltage Vfb_a generated at the node where the resistors 57, 58 are coupled is applied to the terminal FB.

The resistor 59 and the capacitors 60, 61 are devices for phase compensation of the integrated circuit 56 which is feedback-controlled. The resistor 59 and the capacitor 60 are provided in series between the terminal COMP and the ground, and the capacitor 61 is provided in parallel with them. The voltage generated at the terminal COMP is referred to as a voltage Vcomp here. The voltage Vcomp decreases when the DC voltage Vdc increases to increase the feedback voltage Vfb_a, and increases when the DC voltage Vdc decreases to decrease the feedback voltage Vfb_a.

As described earlier, the negative voltage generated at the resistor 55 is applied to the terminal CS. Also, a power supply voltage Vcc generated at the LLC resonant circuit 21 to be described later is applied to the terminal VCC. The terminal GND is grounded. The activation signal Wup_sig from the microcomputer 15 is inputted to the integrated circuit 56. Upon input of the activation signal Wup_sig, the integrated circuit 56 activates the power factor correction circuit 20.

As thus described, the integrated circuit 56 operates to correct the power factor of the power factor correction circuit 20 and to output the DC voltage Vdc at a target level from the power factor correction circuit 20. Specifically, the integrated circuit 56 turns on the NMOS transistor 52 when the negative voltage generated at the resistor 55 becomes zero.

Then, when the ramp voltage that increases when the NMOS transistor 52 is turned on reaches the voltage Vcomp determined in accordance with the feedback voltage Vfb_a, the integrated circuit 56 turns off the NMOS transistor 52. Because the voltage Vcomp decreases when the DC voltage Vdc increases, the on-duration of the NMOS transistor 52 is shortened. Accordingly, the counter electromotive force generated at the coil L0 when the NMOS transistor 52 is turned off decreases, producing less current for charging the capacitor 54.

Meanwhile, because the voltage Vcomp increases when the DC voltage Vdc decreases, the on-duration of the NMOS transistor 52 is extended. Accordingly, the counter electromotive force generated at the coil L0 when the NMOS transistor 52 is turned off increases, producing more current for charging the capacitor 54. In this way, the integrated circuit 56 causes the power factor correction circuit 20 to generate the DC voltage Vdc at the target level by adjusting the on-duration of the NMOS transistor 52.

The maximum value of the inductor current IL that flows through the coil L0 while the NMOS transistor 52 is on is determined in accordance with the rectified voltage Vrec1. Thus, the average value of the inductor current IL has a shape similar to the rectified voltage Vrec1 obtained by full-wave rectifying the AC voltage Vac. Note that the frequency of the AC voltage Vac is 50 Hz or 60 Hz, whereas the switching frequency of the NMOS transistor 52 has a frequency range in the unit of kHz.

In other words, the power factor correction circuit 20 corrects power factor by causing the waveform of the AC voltage Vac applied to the nodes N2, N3 to be similar to a waveform indicating the average of the input current inputted from the nodes N2, N3. Note that the power factor correction circuit 20 corresponds to a "second power supply circuit". Also, the DC voltage Vdc corresponds to a "second output voltage", and the NMOS transistor 52 corresponds to an "another switch".

Overview of the LLC Resonant Circuit 21

Figure 6:
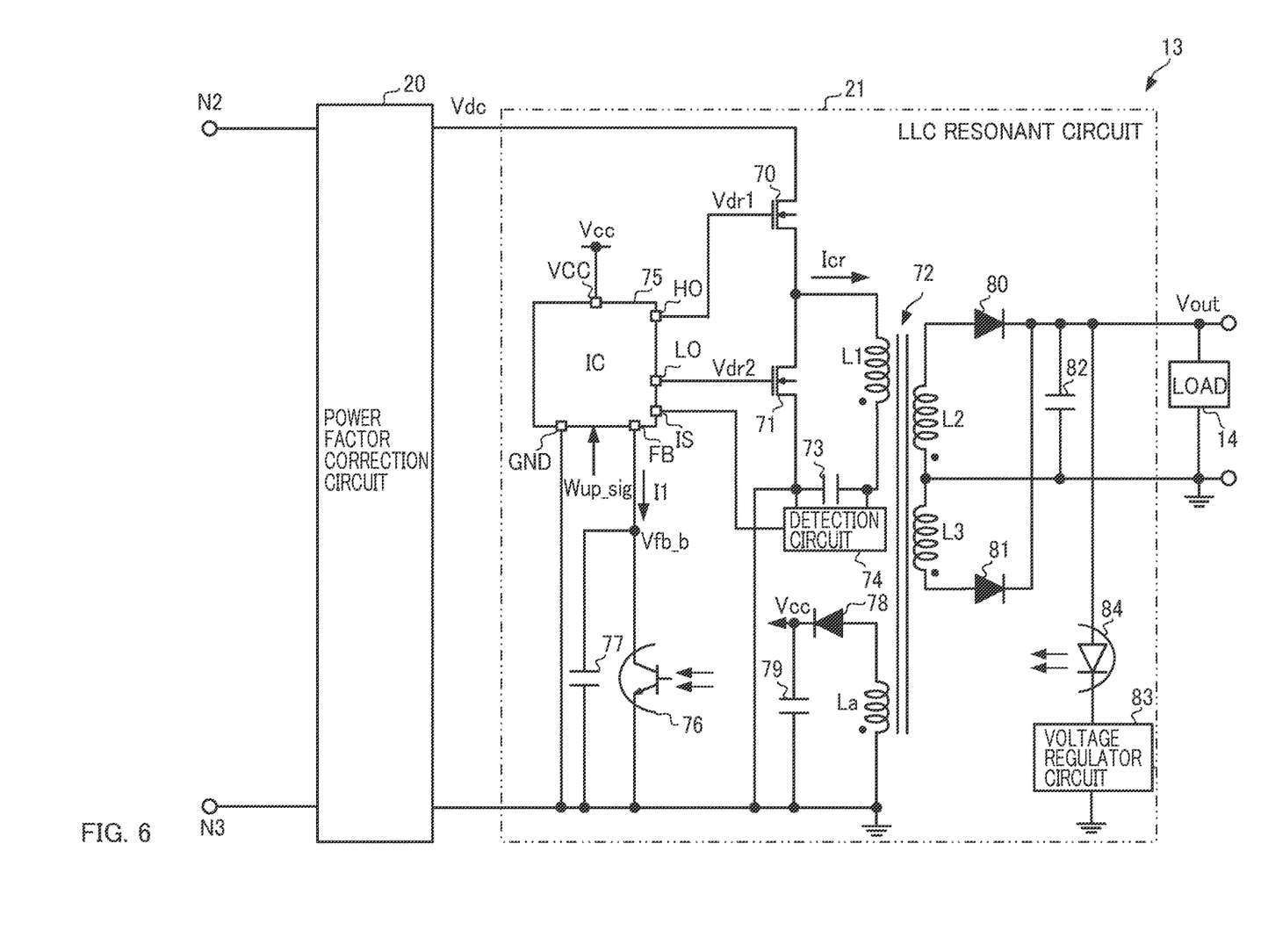
FIG. 6 is a diagram illustrating an example of an LLC resonant circuit 21.

FIG. 6 is a diagram illustrating an example of the LLC resonant circuit 21. The LLC resonant circuit 21 generates the output voltage Vout from the DC voltage Vdc. The LLC resonant circuit 21 is an LLC current resonant converter that generates the output voltage Vout at a target level for the load 14 from a predetermined DC voltage Vdc.

The LLC resonant circuit 21 is configured including NMOS transistors 70, 71, a transformer 72, capacitors 73, 77, 79, 82, a detection circuit 74, an integrated circuit (IC) 75, a phototransistor 76, diodes 78, 80, 81, a voltage regulator circuit 83, and a light-emitting diode 84.

The NMOS transistor 70 is a high-side power transistor, and the NMOS transistor 71 is a low-side power transistor. Although the NMOS transistors 70, 71 are used as switching devices in the embodiment of the present disclosure, for example, PMOS (P-type metal-oxide semiconductor) transistors or bipolar transistors may be used instead.

The transformer 72 includes a primary coil L1, secondary coils L2, L3, and an auxiliary coil La, and the primary coil L1, the secondary coils L2, L3, and the auxiliary coil La are insulated from one another. In the transformer 72, a voltage is generated at the secondary coils L2, L3 on the secondary side in accordance with a change in the voltage across the primary coil L1 on the primary side, and a voltage is generated at the auxiliary coil La on the primary side in accordance with a change in the voltage across the secondary coils L2, L3.

The primary coil L1 has one end coupled to the source of the NMOS transistor 70 and the drain of the NMOS transistor 71 and has the other end coupled to the source of the NMOS transistor 71 via the capacitor 73.

Thus, once the NMOS transistors 70, 71 start being driven, the voltage at each of the secondary coils L2, L3 and the auxiliary coil La changes. Note that the primary coil L1 and the secondary coils L2, L3 are electromagnetically coupled to each other with the same polarity, and the secondary coils L2, L3 and the auxiliary coil La are also electromagnetically coupled to each other with the same polarity.

The detection circuit 74 detects resonant current Icr flowing through the capacitor 73. The detection circuit 74 outputs the polarity of the resonant current Icr to the integrated circuit 75 to be described later. Descriptions will be given later about the phototransistor 76, the capacitors 77, 79, and the diode 78.

The diodes 80, 81 rectify the voltage from the secondary coils L2, L3, and the capacitor 82 smooths the rectified voltage. As a result, a smoothed output voltage Vout is generated at the capacitor 82. Note that the output voltage Vout is a DC voltage at a target level.

The voltage regulator circuit 83 is a circuit that generates a constant DC voltage and is configured using, for example, a shunt regulator.

The light-emitting diode 84 is a device for emitting light having an intensity determined in accordance with the difference between the output voltage Vout and an output from the voltage regulator circuit 83. The light-emitting diode 84 forms a photocoupler together with the phototransistor 76 to be described later. In the embodiment of the present disclosure, the higher the level of the output voltage Vout is, the more intense the light from the light-emitting diode 84 becomes.

The integrated circuit 75 is an integrated circuit that drives the NMOS transistors 70, 71 and has terminals VCC, GND, FB, IS, HO, LO.

The terminal VCC is a terminal to which the power supply voltage Vcc is applied to operate the integrated circuit 75. The cathode of the diode 78 and the capacitor 79 having one end grounded are coupled to the terminal VCC. Thus, the capacitor 79 is charged with current from the diode 78 coupled to the auxiliary coil La at its anode, and the charging voltage of the capacitor 79 is used as the power supply voltage Vcc for operating the integrated circuit 75.

The terminal GND is a terminal to which ground voltage is applied, and is coupled to, e.g., the casing of an apparatus in which the power supply device 10 is provided.

The terminal FB is a terminal at which a feedback voltage Vfb_b determined in accordance with the output voltage Vout is generated, and the phototransistor 76 and the capacitor 77 are coupled to the terminal FB. The phototransistor 76 passes, from the terminal FB to the ground, bias current I1 being of a magnitude in accordance with the intensity of the light from the light-emitting diode 84, and the capacitor 77 is provided to remove noise between the terminal FB and the ground.

Thus, the phototransistor 76 operates as a transistor that generates sink current. The integrated circuit 75 also has therein a resistor (not illustrated) provided between the terminal FB and power supply voltage (not illustrated). Then, the feedback voltage Vfb_b is generated based on a voltage drop caused by the bias current I1 flowing through the resistor.

The terminal IS is a terminal to which voltage determined in accordance with the current value of the resonant current Icr of the primary coil L1 is applied from the detection circuit 74.

The terminal HO is a terminal from which a driving signal Vdr1 is outputted to drive the NMOS transistor 70, and the gate of the NMOS transistor 70 is coupled to the terminal HO.

The terminal LO is a terminal from which a driving signal Vdr2 is outputted to drive the NMOS transistor 71, and the gate of the NMOS transistor 71 is coupled to the terminal LO. Note that the integrated circuit 75 outputs the driving signals Vdr1, Vdr2 based on the polarity of the resonant current Icr detected by the detection circuit 74 so that what is called off-resonance will not occur. The driving signals Vdr1, Vdr2 are pulse signals having a constant (e.g., 50%) duty ratio in principle.

Also, the activation signal Wup_sig from the microcomputer 15 to be described later is inputted to the integrated circuit 75. The integrated circuit 75 activates the LLC resonant circuit 21 when the activation signal Wup_sig is inputted thereto.

As thus described, the integrated circuit 75 operates so that the LLC resonant circuit 21 may generate the output voltage Vout at the target level. Specifically, when the output voltage Vout exceeds the target level, the intensity of the light from the light-emitting diode 84 increases; thus, the bias current I1 increases, and the feedback voltage Vfb_b decreases. In this case, the integrated circuit 75 increases the frequency of the driving signals Vdr1, Vdr2 to decrease gain which is the ratio of the output voltage Vout to the DC voltage Vdc.

When the horizontal axis represents frequency and the vertical axis represents gain, the gain typically exhibits an upwardly convex shape at a peak of the resonant frequency of the coil L1 and the capacitor 73. Also, in order to prevent what is called off-resonance, the driving signals Vdr1, Vdr2 are set to have frequencies higher than the resonance frequency.

By contrast, when the output voltage Vout falls below the target level, the intensity of the light from the light-emitting diode 84 decreases; thus, the bias current I1 decreases, and the feedback voltage Vfb_b increases. In this case, the integrated circuit 75 decreases the frequency of the driving signals Vdr1, Vdr2 to increase gain.

In this way, the integrated circuit 75 causes the LLC resonant circuit 21 to generate the output voltage Vout at the target level. Note that the LLC resonant circuit 21 corresponds to a "second load".

Details of the Microcomputer 15

Referring back to FIG. 1, the microcomputer 15 controls the power supply device 10. The microcomputer 15 has terminals VDD, RCV, GND. The power supply voltage Vdd from the power supply circuit 12 is applied to the terminal VDD, and the microcomputer 15 operates using the power supply voltage Vdd as its power supply voltage. The capacitor 16 is provided between the terminal VDD and the ground to stabilize the power supply voltage Vdd.

The photodiode 17 is provided between the terminal RCV and the ground and receives, for example, an infrared signal from a remote controller (not illustrated) of the television. Note that the microcomputer 15 controls the operation of the television based on the signal that the photodiode 17 receives.

When the photodiode 17 receives a signal transmitted from the remote controller to turn on the television, the microcomputer 15 outputs the signal SW_sig for turning on the switch 18. When the switch 18 is turned on, the AC voltage Vac is applied to the nodes N2, N3, so that the AC voltage Vac is applied to the power supply circuit 13. After that, the microcomputer 15 outputs the activation signal Wup_sig to the integrated circuits 56, 75 in the power supply circuit 13. Note that the signal SW_sig corresponds to a "predetermined instruction", and the switch 18 corresponds to a "switching device".

The power factor correction circuit 20 and the LLC resonant circuit 21 in the power supply circuit 13 are thus activated to supply power to the load 14 (e.g., a television).

Meanwhile, when the photodiode 17 receives a signal transmitted from the remote controller to turn off the television, the microcomputer 15 outputs the signal SW_sig for turning off the switch 18. When the switch 18 is turned off, the AC voltage Vac is not applied to the nodes N2, N3, so that the power supply circuit 13 stops supplying power to the load 14, bringing the television into standby state.

Although the television is now in standby state, the AC voltage Vac is still being applied to the power supply circuit 12, and therefore the power supply circuit 12 keeps applying the power supply voltage Vdd to the microcomputer 15. Thus, even if the television is in standby state, the microcomputer 15 is in operation and can receive a signal from the remote controller. Note that the microcomputer 15 corresponds to a "control device".

Summary

The power supply device 10 of the embodiment of the present disclosure has been described above. The power supply circuit 12 includes the full-wave rectifier circuit RC0, the NMOS transistor 38, and the control IC 37. The control IC 37 controls the NMOS transistor 38 to bring the power supply voltage Vdd to a predetermined level. Also, when the NMOS transistor 38 is on, the power supply circuit 12 causes input current determined in accordance with the AC voltage Vac to return to the AC power supply 11. In this way, the power supply circuit 12 allows the power supply voltage Vdd to stay at the predetermined level without wasting the power from the AC power supply 11. Thus, power consumption can be lowered for the power supply circuit that generates an output voltage at a predetermined level from an AC voltage.

The power supply circuit 12 also includes the diode 36 and the capacitor 39. When voltage at the anode of the diode 36 is higher than the charging voltage of the capacitor 39 by the forward voltage at the diode 36 or more, the diode 36 turns on and supplies current to the capacitor 39. As a result, the capacitor 39 is charged. Meanwhile, when voltage at the anode of the diode 36 is lower than the charging voltage of the capacitor 39, the diode 36 turns off and stops supplying current to the capacitor 39. As a result, the capacitor 39 is not charged. Thus, the diode 36 prevents current from flowing reversely from the capacitor 39 toward the full-wave rectifier circuit RC0.

Also, the control IC 37 turns off the NMOS transistor 38 when the power supply voltage Vdd is at the level VL1 and turns on the NMOS transistor 38 when the power supply voltage Vdd is at the level VL2. Thus, the control IC 37 charges the capacitor 39 when the power supply voltage Vdd is at the level VL1, and causes current to return to the AC power supply 11 via the NMOS transistor 38 when the power supply voltage Vdd is at the level VL2. In this way, the power supply circuit 12 can generate the power supply voltage Vdd at the predetermined level.

The power supply circuit 12 also has the full-wave rectifier circuit RC0 as a rectifier circuit. Thus, the power supply circuit 12 can effectively use power from the AC power supply 11 to generate the power supply voltage Vdd at the predetermined level.

The power supply circuit 12 also has the NMOS transistor 38 as a switch. Thus, the power supply circuit 12 can turn on the NMOS transistor 38 in the linear region and limit the current value of free-wheeling current.

The power supply device 10 includes the power supply circuits 12, 13, the switch 18, and the microcomputer 15. Thus, even if the television is in standby state, the microcomputer 15 can receive a signal transmitted from a remote controller based on the power supply voltage Vdd applied from the power supply circuit 12.

The present disclosure has been made in view of the above problems in prior art, and has an object to lower power consumption by a power supply circuit that generates an output voltage at a predetermined level from an AC voltage.

The present disclosure can lower power consumption by a power supply circuit that generates an output voltage at a predetermined level from an AC voltage.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A power supply circuit of a step-down type configured to generate an output voltage at a predetermined level from an alternating current (AC) voltage, the power supply circuit comprising:
    a rectifier circuit configured to rectify the AC voltage;
    a first line coupled to the rectifier circuit;
    a second line on a ground side;
    a switch coupled between the first line and the second line; and
    a control circuit configured to control the switch to bring a level of the output voltage to the predetermined level, wherein
    the power supply circuit is free of an inductor interposed between the first line and the rectifier circuit;
    the rectifier circuit has a first input terminal and a second input terminal; and
    the power supply circuit further includes:
        a first capacitor coupled to the first input terminal of the rectifier circuit, and
        a second capacitor coupled to the second input terminal of the rectifier circuit, wherein
            the AC voltage is applied to the first and second capacitors.

2. The power supply circuit according to claim 1, further comprising:
    a diode having an anode and a cathode, the anode being coupled to the first line; and
    a capacitor coupled to the cathode of the diode, the capacitor being configured to generate the output voltage.

3. The power supply circuit according to claim 1, wherein the control circuit is configured to
    turn off the switch when the level of the output voltage is at a first level, and
    turn on the switch when the level of the output voltage is at a second level higher than the first level.

4. The power supply circuit according to claim 1, wherein the rectifier circuit is a full-wave rectifier circuit configured to perform full-wave rectification to the AC voltage.

5. The power supply circuit according to claim 1, wherein the switch is a metal-oxide semiconductor (MOS) transistor having
    a drain coupled to the first line, and
    a source coupled to the second line.

6. A power supply device comprising:
    a first power supply circuit of a step-down type, configured to generate a first output voltage at a predetermined level from an alternating current (AC) voltage;
    a second power supply circuit of a booster type, configured to generate a second output voltage from the AC voltage;
    a control device coupled to the first power supply circuit and the second power supply circuit; and
    a switching device having a first end and a second end, the first end receiving the AC voltage, the second end being coupled to the second power supply circuit, wherein
    the first power supply circuit includes
        a first rectifier circuit configured to rectify the AC voltage,
        a first line coupled to the first rectifier circuit,
        a second line on a ground side,
        a switch coupled between the first line and the second line, and
        a control circuit configured to control the switch to bring a level of the first output voltage to the predetermined level,
    the first power supply circuit being free of an inductor interposed between the first line and the first rectifier circuit; and
    the second power supply circuit includes
        a second rectifier circuit coupled to the second end of the switching device, the second rectifier circuit being configured to rectify the AC voltage when the switching device is on, to thereby generate a second rectified voltage, and
        an output circuit including
            an inductor coupled to the second rectifier circuit, and
            another switch configured to control current flowing through the inductor,
            the output circuit being configured to output the second output voltage based on the second rectified voltage from the second rectifier circuit, wherein
    the control device is configured to
        receive a predetermined instruction,
        receive the first output voltage as a power supply voltage thereof, and
        control the switching device based on the predetermined instruction.

7. The power supply device according to claim 6, wherein the first power supply circuit is configured to supply first power to a first load of the first power supply circuit, the second power supply circuit is configured to supply second power to a second load of the second power supply circuit, and
the first power is smaller than the second power.

* * * * *